United States Patent [19]

Williams et al.

[11] Patent Number: 4,936,941
[45] Date of Patent: Jun. 26, 1990

[54] AUTOMATIC SKIN TAPING MACHINE

[75] Inventors: Clyde L. Williams, Grand Prairie; James E. Knight, Aubrey, both of Tex.; William W. Tilly, Fresno, Calif.

[73] Assignee: LTV Aerospace and Defense Co., Dallas, Tex.

[21] Appl. No.: 179,275

[22] Filed: Apr. 8, 1988

[51] Int. Cl.$^5$ .............................................. B32B 35/00
[52] U.S. Cl. .................................... 156/353; 156/497; 156/522; 156/523; 156/538; 156/572; 156/577
[58] Field of Search .............. 156/538, 522, 523, 572, 156/574, 577, 353, 273.1, 497

[56] References Cited

U.S. PATENT DOCUMENTS

| | | | |
|---|---|---|---|
| 2,624,442 | 1/1953 | Seidel | 156/538 |
| 3,655,316 | 4/1972 | Hüsges | 156/574 |
| 3,671,362 | 6/1972 | Pierce et al. | 156/523 |
| 3,971,691 | 7/1976 | Cairns | 156/522 |

FOREIGN PATENT DOCUMENTS 707734  4/1965  Canada .............................. 156/273.1

Primary Examiner—Michael Wityshyn
Attorney, Agent, or Firm—W. Jackson; J. M. Cate

[57] ABSTRACT

The invention is an automatic skin taping machine for use in applying a protective coating to sheets of material, especially aluminum. The machine comprises a main frame, a transfer car movable within the main frame, an applicator that uniformly applies the coating to the sheet of material by moving over the surface of the sheet, a retainer that immobilizes the sheet of material while the applicator is applying the coating, and a vacuum lift system for transferring the sheet of material from an application position to a storage position. In a preferred embodiment, the application includes a floating roller and a squeegee device.

16 Claims, 4 Drawing Sheets

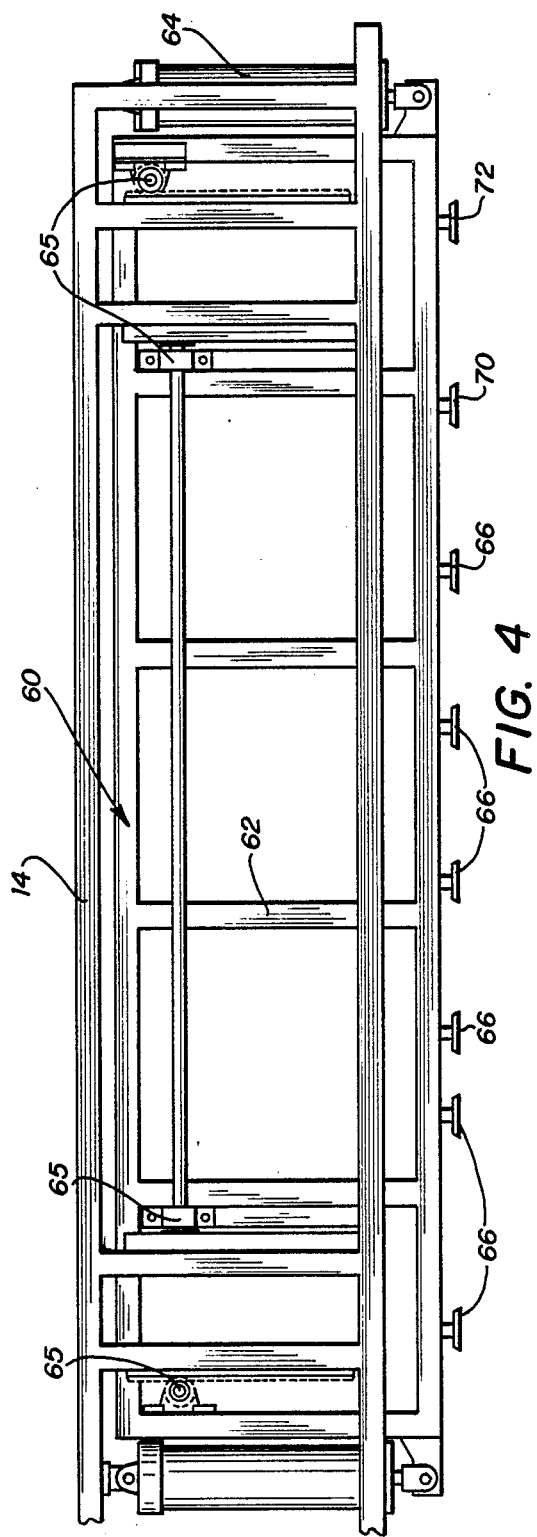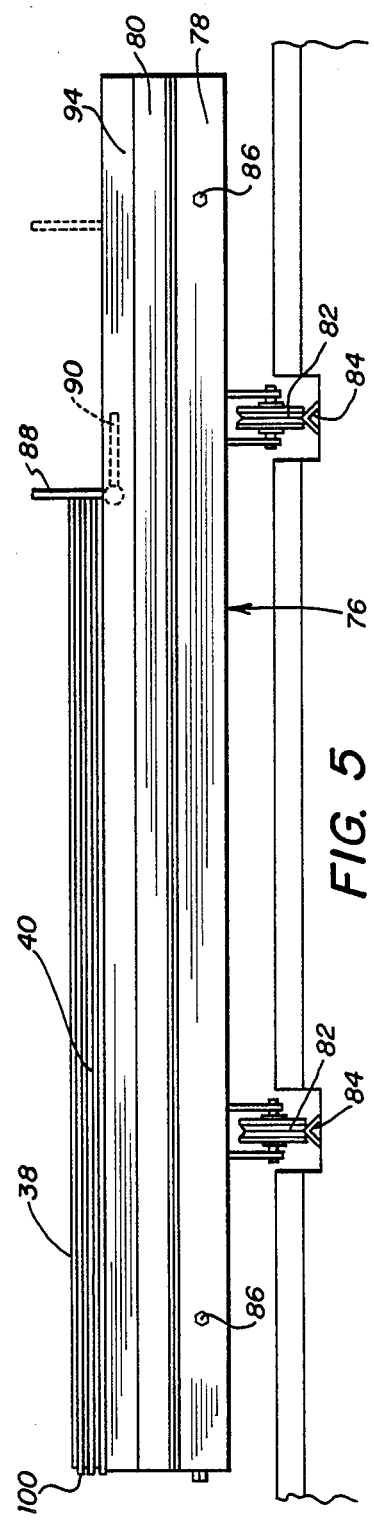

AUTOMATIC SKIN TAPING MACHINE

TECHNICAL FIELD

The invention relates to an automatic skin taping machine for use in applying a protective coating such as tape or film onto the surface of a sheet of material such as aluminum sheeting used in the fabrication of aircraft.

BACKGROUND

The invention provides an automatic skin taping machine designed particularly for use in applying a protective coating to the highly polished surface of aluminum sheeting used in aircraft fabrication. The invention, however, may be adapted for other uses that require the application of a film to a relatively smooth surface. The invention is especially useful in working with sheets of material having a highly polished or sensitive surface as the invention provides a completely automated, hands-off film application system that avoids any contact with the sheet surface until the protective coating is applied.

As known in the aircraft industry, temporary protective coatings are applied to aluminum sheeting in order to protect the highly polished surface of the aluminum sheets during the fabrication process. This highly polished surface is used to form the outer surface on an aircraft and provides the finished aircraft with a mirror finish that has less drag and a shiny appearance. In order to preserve this mirror finish, the polished surface must be protected during transportation, fabrication, and construction of the aircraft outer surface parts. At the mill, the aluminum sheets are packaged with a foam protective layer covering the polished surface, and the aluminum sheets are delivered to the fabricator in palletized stacks with the foam layer interspersed between each aluminum sheet. In order to be adequately protected during fabrication, however, the polished surface of the aluminum sheets must be protected with a coating, such as a tape or film, that is adhered to the polished surface and that may be later removed. Indeed, the aircraft industry has developed specifications relating to the types of coating that may be used. One example of such specifications for coating materials is the Boeing Company's aircraft specification number 5034 which lists the various types of approved coating materials. Included therein are various types of films which are mostly vinyl-based products with a removable or nonadhering adhesive. Various types of tapes that generally have a paper backing with an adhesive that becomes somewhat adhering over time are also included. For both the films and the tapes, it is critical to apply them to the sheet as close to the point in time when the part will be fabricated as possible to avoid difficulty in removing them.

The aircraft industry has also developed specifications for the handling of the aluminum sheeting and the application of the approved coatings. The polished surface of the aluminum sheeting is so sensitive that it can't even be touched with human hands and workers must use cotton gloves to handle the sheets. Any slight scratch or abrasion of the surface must be polished out before the sheet of aluminum can be used. The application of the protective coating, therefore, must be performed in a manner so as to avoid any contact with the polished surface to keep from blemishing or marring the surface. Further, the protective coating must be applied uniformly over the surface and without any significant number of air bubbles or creases in the coating. Creases or air bubbles in the coating can result in marring of the surface during fabrication as tiny pieces of aluminum from the router or saw may lodge in the pockets and eventually scratch the polished surface.

Due to the care required, the application of the protective coating in accordance with the specifications can be a somewhat slow and painstaking process. One system of application used in the past included the manual application of the tape or film by laying it out over an aluminum sheet and applying it by hand. In the tape coatings, any air bubbles or creases could be worked out by hand, but in the films, air bubbles or creases are difficult to work out by hand. The manual application of the coatings is labor intensive and requires extensive care in handling the sheets.

Another application system commonly used in the aircraft industry involves the use of a machine with a pair of oppositely rotating rollers. In using such a device, the aluminum sheets are lifted one at a time by hand and pushed in between the rollers, and the top roller applies the coating to the aluminum sheet. The sheet must be handled on both ends, i.e., into and out of the rollers, and it is significant that the applicator is stationary while the sheets are passed through the applicator. The disadvantages of such a system are that it requires handling of each sheet and touching the polished surface prior to it being protected.

In contrast, the present invention provides an automatic system for applying the protective coatings without the need for handling each sheet, and further, it avoids any contact with the polished surface until the protective coating has been applied.

SUMMARY OF THE INVENTION

The invention provides an automatic skin taping machine for use in applying a protective coating layer to a sheet of material. The invention is particularly useful in applying a film or tape layer to the polished surface of aluminum sheeting used in aircraft fabrication. The invention provides a hands-off system of applying the coating and eliminates any contact or handling of the sheet prior to application of the protective coating. Further, in contrast to the prior art, the machine can work from a stack of materials, and the applicator applies the film by passing over each sheet of material rather than by feeding the sheets through the applicator.

In a preferred embodiment of the invention, the skin taping machine comprises a main frame; a transfer car that is movably engaged within the main frame and is capable of movement along the length of the main frame; applicator means for uniformly applying a coating to a sheet of material without a significant number of air bubbles or creases in the coating, and the applicator means being attached to the transfer car and capable of movement from a first raised position to a second applicating position; vacuum lift means attached to the transfer car for lifting a sheet of material from the stack to a raised position after the coating has been applied by engaging the coated side of the sheet; and retaining means for immobilizing the sheet of material while the applicator means moves over the surface of the sheet and the coating is applied. It is preferred that the applicator means comprise a "floating" roller and a squeegee positioned near the trailing edge of the roller. The squeegee aids in adhering the coating to the sheet and in eliminating air bubbles or creases. Also in a preferred embodiment, the vacuum lift means comprises a series of vacuum cups arranged so as to be distributed over the surface of the sheet when in a lowered position. The vacuum cups are connected to an air cylinder and pump that supply a vacuum sufficient to raise the coated sheet from the stack. Further, in a preferred embodiment, the retaining means is an adjustable removable stop block that engages the far end of the stack of sheets and keeps the sheet and the stack from sliding as the coating is applied by the roller.

In use, the coating is applied by the applicator means to the top side of the sheet by passing the applicator means over the surface of the sheet. In a preferred embodiment, the applicator means moves over the surface of the sheet as the transfer car moves from one end of the frame to the other. The correct width of coating is selected, the applicator is set for the proper height, and the coating is applied by the applicator as the transfer car moves over the sheet. As the end of the sheet is sensed, the transfer car stops, the applicator moves to a raised position, and a cutter cuts the film off near the end of the sheet. The transfer car then reverses its direction and returns to its initial position where the vacuum lift system is lowered so that the vacuum cups contact the coated surface of the sheet. Upon contact, the vacuum is switched on automatically and the vacuum cups adhere to the sheet. The vacuum lift means is then raised to its initial position thereby lifting the sheet of material from the stack. The transfer car then travels towards the far end of the main frame to deposit the coated sheet on a storage car. In an automatic operation mode, the applicator means applies a coating to a second sheet of material as the transfer car moves to transfer the first sheet to the storage car.

Further, in a preferred embodiment, the removable block which acts to retain the stack of materials while the coating is applied to the sheet is tripped by a lead rod attached to the applicator which contacts the block and causes the block to drop from an upright position to a lowered position below the surface of the sheet in order to allow the applicator means to pass by without obstruction. Further the retaining means is adjustable in position to accommodate various lengths of sheet material.

The machine of the present invention is also adaptable to apply protective coatings to various widths of sheet material. In a preferred embodiment, a carousel is provided that is capable of holding multiple rolls of coating having differing widths, and the appropriately sized coating may be selected and provided to the applicator.

BRIEF DESCRIPTION OF THE DRAWINGS

For a more complete understanding of the present invention, and for further details and advantages thereof, reference is now made to the following detailed description to be read in conjunction with the accompanying drawings, wherein like reference characters denote like parts in all views and where:

FIG. 4 is a side view of the transfer car and the vacuum lift system; and

FIG. 5 is a side view of the applicator table and removable block.

DETAILED DESCRIPTION

The invention is an automatic skin taping machine for applying a protective coating to a sheet of material, particularly aluminum sheets having a highly polished surface. As used herein, "coating" shall include various types of films and tapes that may be applied to protect a surface and usually includes an adhesive applied to one side of the coating material. It is preferred that the adhesive be removable and nonbonding but sufficiently tacky to adhere the coating to the sheet. The coatings are generally thin, on the order of 1–50 mils, but thicker coatings may also be applied.

Figure 1:
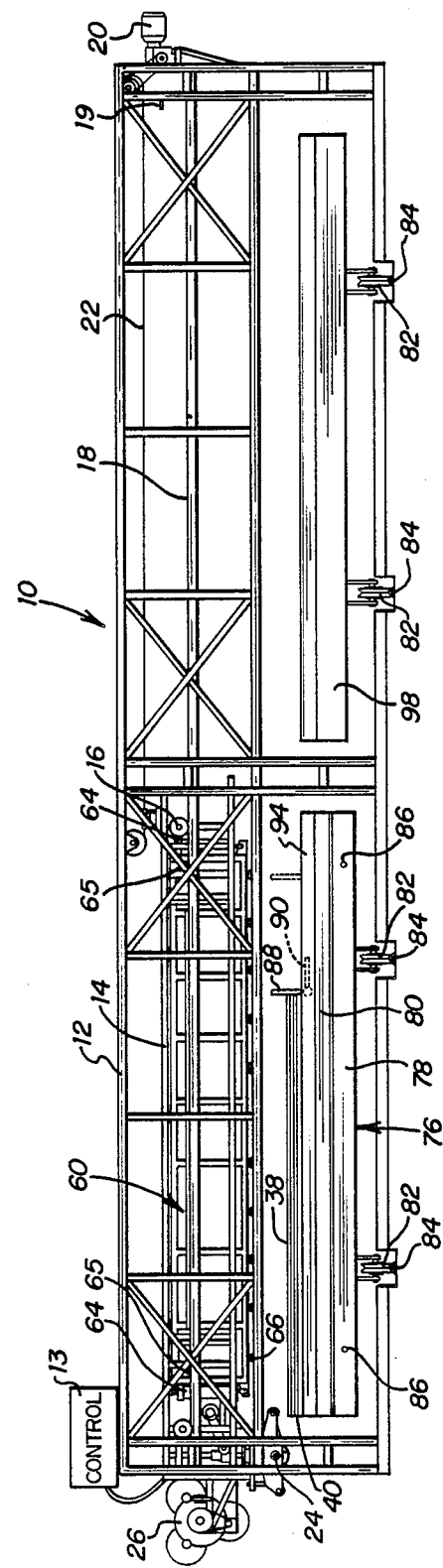
FIG. 1 is a side view of a preferred embodiment of the invention.

Referring now to the drawings and the preferred embodiment illustrated therein, FIG. 1 shows an automatic skin taping machine 10 as described by the present invention. The machine 10 comprises a mainframe 12 that substantially encloses and gives support to the various parts of machine 10. Mainframe 12 is constructed of heavy gage material sufficient to withstand the stresses and strains applied to it during the operation of machine 10. Contained substantially within mainframe 12 is a transfer car 14 that is capable of movement along the length of mainframe 12. Transfer car 14 is supported by wheels 16 that ride upon track 18 that is positioned along either side of mainframe 12. Transfer car 14 is powered by motor 20 that is positioned at the far end of mainframe 12 which drives transfer car 14 by means of chain drive 22. Thus, transfer car 14 moves substantially the entire length of mainframe 12.

Attached to the near end of transfer car 14 is applicator 24 and carousel 26. Included within transfer car 14 is vacuum lift system 60 which is vertically movable with respect to transfer car 14 by means of air cylinders 64 and gears 65. Also shown in FIG. 1 is applicator car 76 containing stack 40 of sheets of material to be coated. Engaging the distant end of stack 40 is block 88 which prevents stack 40 from sliding. Storage car 98 is also shown in FIG. 1. Both applicator car 76 and storage car 98 have wheels 82 which ride on tracks 84 in the foundation. In addition, car 76 and car 98 may be equipped with driving motors, not shown, for moving the cars in and out of frame 12. Further, machine 10 is equipped with control box 13 shown mounted on frame 12, but it may also be located remote to machine 10.

Figure 2:
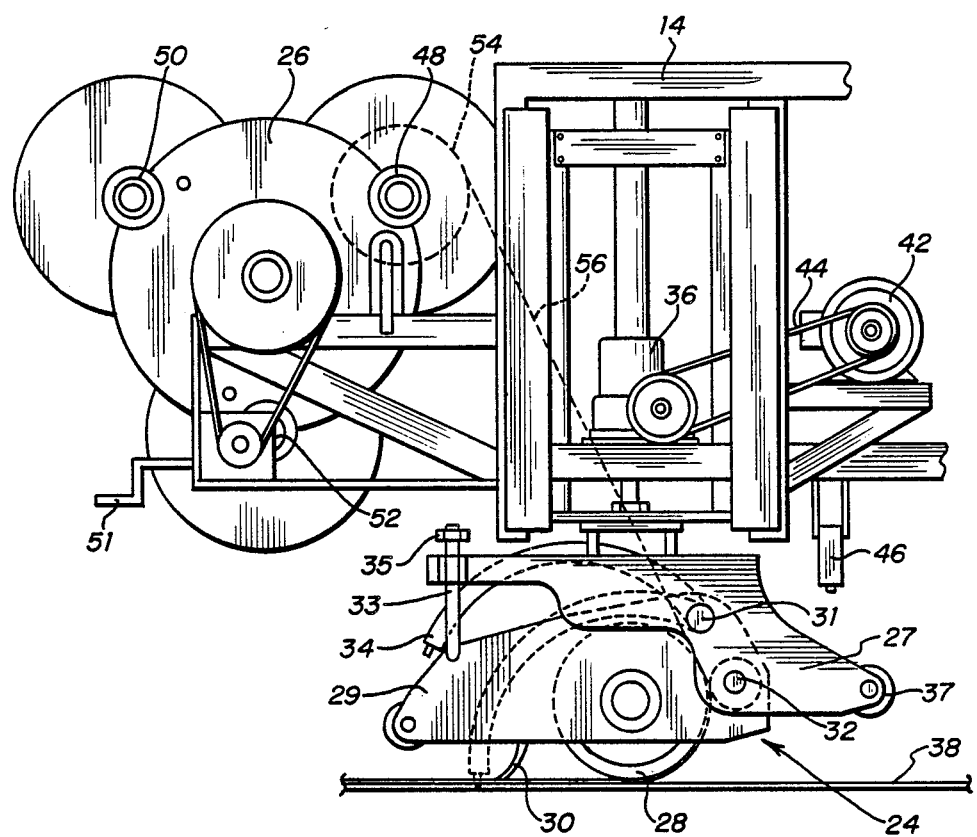
FIG. 2 is a sectional view showing the preferred applicator means and carousel arrangement.

Referring now to FIG. 2, applicator 24 and carousel 26 are illustrated in more detail. Applicator 24 is movable vertically with respect to transfer car 14 between a raised position and a range of lowered applicating positions in which a coating is applied to a sheet of material. Applicator 24 includes roller 28 and squeegee 30 which cooperate to apply the coating uniformly and without a significant number of air bubbles or creases. Applicator 24 is shown in the applicating position with roller 28 applying film 54 to sheet 38 which is the top sheet in stack 40. Applicator 24 further consists of two plates 27 and 29 secured together by bolt 31. Plate 27 is attached to jack 36 which is connected to transfer car 14. Applicator 24 is raised and lowered by jack 36 which is powered by motor 42 through a belt 44. Plate 29 is also connected to plate 27 by bolt 33 secured by nut 35. The connection through bolt 33 is "loose" in that it allows plate 29 to pivot about bolt 31. In the applicating position, as shown, a space of about ½ inch is desired between nut 35 and plate 27 thereby allowing plate 29 to pivot and roller 28, which is mounted to plate 29 at its ends, to "float" as it applies film 54. This "floating" ability allows roller 28 to adapt to a slightly wavy surface of sheet 38.

In its raised position, there is no gap between nut 35 and plate 27 as the weight of the roller (which may weigh in the area of 500 pounds) pulls nut 35 tight against plate 27. To achieve this floating ability, applicator 24 is lowered from its raised position to its lowered position with roller 28 contacting the surface of sheet 38. Jack 36 then drives plate 27 down so that the desired space is achieved between nut 35 and plate 27. As applicator 24 moves over the surface of sheet 38, this space may change as roller 28 "floats" over the surface of sheet 38 and plate 29 pivots about bolt 31.

It is preferred that roller 28 have a neoprene surface and that roller 28 be heavy enough so that its own weight is sufficient to apply the coating effectively. Cooperating with roller 28 in the application of film 54 is squeegee 30 which is positioned behind the trailing edge of roller 28. Squeegee 30 is preferably a semi-resilient hard rubber device that assumes a "wiping" position as shown in FIG. 2. It is discovered that the best application of coating is achieved by positioning the squeegee within 1 to 6 inches of the trailing edge of roller 28.

Applicator 24 further includes a guide roller 32 which presses film 54 against roller 28 thereby reducing the chance of creases in film 54. As guide roller 32 contacts the adhesive side of film 54, it is preferred that guide roller 32 include discs positioned along its length with narrow edges to reduce the surface area contacting the sticky side of film 54. Applicator 24 also has a leading rod 37 that clears the roller path and is especially used for tripping block 88.

Attached to applicator 24 is cutter 34 shown in its raised position in FIG. 2 and also in its lowered position in phantom. Cutter 34 is also attached to bolt 31 and pivots about that point. Cutter 34 is preferably a hot wire cutter that extends the entire width of applicator 24.

As the applicator 24 has passed the end of sheet 38, cutter 34 drops from its raised position to its lowered position thereby cutting the film 54 beyond the end of sheet 38.

In FIGS. 1 and 2, carousel 26 is shown consisting of three film roll shafts 48, 50 and 52. These three shafts are located 120° apart on the carousel 26 and are capable of receiving differing widths of rolls of film or tape. Carousel 26 is rotated to position the desired film roll in the applicating position by turning the crank 51. As shown, shaft 48 is in the applicating position. A roll of film 54 is loaded on shaft 48, and film 54 is threaded through the applicator mechanism as shown by the dotted line 56, in between rollers 28 and guide roller 32 and around the leading edge and underneath roller 28.

Figure 3:
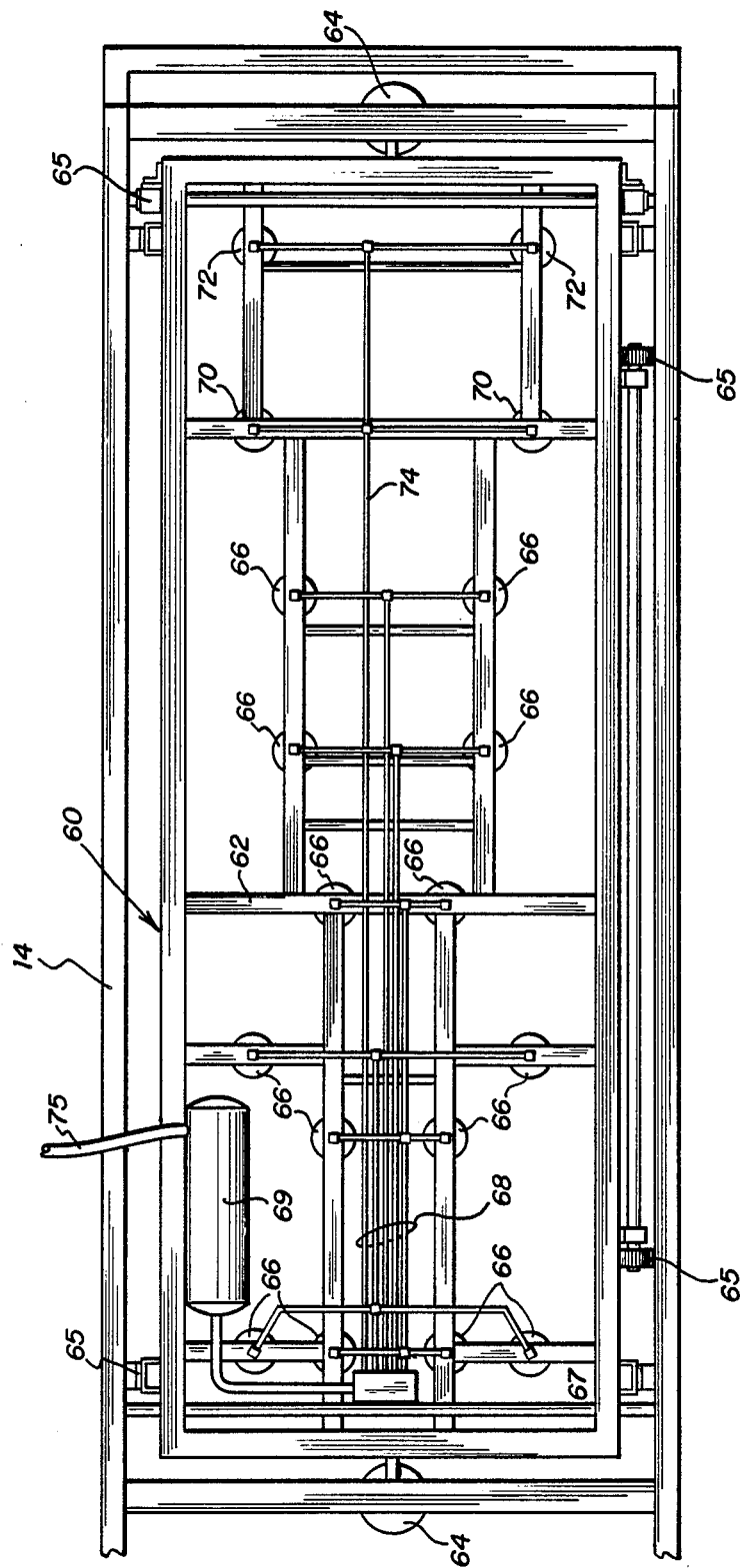
FIG. 3 is a top view of the transfer car showing the arrangement of the vacuum lift system.

The vacuum lift system 60 as shown in FIG. 1 and is illustrated in more detail in FIGS. 3 and 4. FIG. 3 shows a top view of the vacuum lift system portion of transfer car 14. FIG. 4 shows a side view of the same portion of transfer car 14. In the preferred embodiment, vacuum lift system 60 includes frame 62, air cylinders 64, gear 65, vacuum cups 66, piping 68, and accumulator 69. Vacuum lift system 60 is vertically movable in relation to transfer car 14 and has a raised position and a range of lowered positions. Vacuum lift system 60 is connected to transfer car 14 by air cylinders 64 which have one end attached to transfer car 14 and the other attached to frame 62 of vacuum lift system 60, and the gears 65 have a portion mounted on transfer car 14 with an associated roller portion attached to transfer car 14. Air cylinders 64 provide the means for raising and lowering vacuum lift system 60 while the gears 65 control the pitch and yaw of vacuum lift system 60.

Vacuum cups 66 are spaced as shown so as to be distributed over the surface of sheet 38 when vacuum lift system 60 is lowered to contact the coated side of the sheet. Preferably, vacuum cups 66 are covered with styrofoam, or some other protective material so to prevent any abrasion of the polished surface of sheet 38 through the coating. As shown in FIG. 3, each pair of vacuum cups has its own set of piping 68 that provides vacuum to the cups 66. This arrangement of piping 68 allows the vacuum system to be tailored for the appropriate length of sheet 38. Thus, if vacuum cups 70 and 72 located at the distant end of transfer car 14 will not contact sheet 38 when the vacuum lift system is lowered, then the vacuum provided to these cups by the vacuum lines 74 may be turned off to avoid sucking air into the system and thereby weakening the vacuum provided to the other cups 66. The vacuum system requires a vacuum sufficient to lift the sheet 38 and to retain it in a raised position. The vacuum is provided by a pump, not shown, through line 75 and accumulator 69.

FIG. 5 shows a preferred embodiment of applicator car 76 which includes a base portion 78 and an adjustable table 80. As shown in FIG. 1, applicator car 76 is positioned within main frame 12, but car 76 may be rolled out of main frame 12 by means of wheels 82 to provide for easy loading of stack 40. Wheels 82 preferably ride upon track 84 which is set in the foundation. The alignment of table 80 relative to film 54 may be adjusted by use of adjustment means 86 which may include various gears or pivots within base 78. Alignment means 86 allows stack 40 to be loaded on car 76 without exact precision as the alignment of stack 40 with applicator 24 may be made precise by use of adjustment means 86. Also shown in FIGS. 1 and 5 is block 88 which is attached to table 80 and engages the distant end of stack 40. Block 88 slides along a track, not shown, in table 80, and block 88 may be positioned at any desired location along the length of table 80 as shown in phantom in FIGS. 1 and 5, in order to accommodate the varying lengths of stack 40. Block 88 serves to immobilize sheet 38 and stack 40 as applicator 24 applies pressure to sheet 38 in applying film 54 along the length of sheet 38. It is important that sheet 38 be stationary during the application of film 54 in order to achieve a uniform application and adhesion of film 54. In a preferred embodiment, block 88 is removable from the upright position to the lowered block position 90 shown in phantom in FIGS. 1 and 5. Block 88 drops to this lowered position 90 upon contact with leading rod 37 attached to applicator 24. Block 88 is designed so that the firm contact with rod 37 easily trips block 88. Other tripping mechanisms may also be used in connection with block 88 such as a timer or position sensor on main frame 12 or transfer car 14. Further, in a manually controlled operation, block 88 may be tripped by a remote control.

In use, applicator car 76 is wheeled outside of main frame 12 and stack 40 is loaded onto table 80 of applicator car 76. Table 80 is equipped with a vertical lip edge 94 that allows stack 40 to be loaded on car 76 using the pallet on which stack 40 has been received and stored. Thus, stack 40 may be loaded on car 76 using a conventional forklift or overhead hoist. After stack 40 is loaded on car 76, car 76 is moved back within main frame 12, preferably by means of a motor drive. The desired width of film is selected from the rolls contained on carousel 26 and the appropriate roll is positioned for application. The film 54 is threaded around the leading edge of roller 28 and underneath roller 28. The edge of stack 40 is aligned with the edge of film 54 by adjusting alignment means 86. Transfer car 14 is positioned so that the leading edge of roller 28 is directly above the front edge of sheet 38, and the applicator 24 is lowered into the application position so that roller 28 contacts sheet 38 and the desired ½ inch space is achieved between nut 35 and plate 27. Again, this space is desired to allow roller 28 to "float" in applying film 54 to the surface of sheet 38.

After applicator 24 is lowered into position to apply film 54, motor 20 is switched on and transfer car 14 moves toward the distant end of frame 12, and applicator 24 applies film 54 to the entire length of sheet 38. As applicator 24 nears the end of sheet 38, leading rod 37 trips block 88 to allow applicator 24 to apply the film to the entire length of sheet 38 and pass by without obstruction. As applicator 24 passes the end of sheet 38, sensor 46, shown in FIG. 2, senses the end of sheet 38 and stops transfer car 14. Cutter 34 is on a timer triggered by sensor 46 which causes it to drop to its lowered position thereby cutting film 54. Applicator 24 is then raised from the applicating position to its raised position. Transfer car 14 then reverses its travel and returns to its position at the near end of main frame 12. Vacuum lift system 60 is lowered so that cups 66 contact the coated surface of sheet 38, and switch 67 senses the contact and turns on the vacuum. Vacuum is supplied only to those cups 66 that are within the appropriate length for the sheet 38. Sheet 38 adheres to the cups 66 and vacuum lift system 60 is raised by cylinders 64 thereby raising sheet 38 from stack 40. Transfer car 14 then moves towards the far end of main frame 12 where end stop 19, shown in FIG. 1, stops transfer car 14 and signals vacuum lift system 60 to lower itself. Switch 67 senses contact with storage car 98, or a pallet on car 98, or previously deposited sheets and turns off the vacuum thereby depositing sheet 38 onto storage car 98, the pallet or previously deposited sheet. Transfer car 14 then returns to the near end of frame 12 to repeat the process. Further, applicator 24 adjusts itself for the new application height making allowances for the coated sheet(s) already transferred to storage car 98.

In a preferred operation mode, as transfer car 14 moves to transfer sheet 38 to storage car 98, applicator 24 is applying a coating to the next sheet in stack 40. The applicator automatically drops down the required additional distance for each sheet. The foam installation 100, shown in FIG. 5, separating the sheets of aluminum in stack 40 may be removed by hand or with a blower or suction device to allow application of film to the next sheet in stack 40. When the coating has been applied to the desired number of sheets in stack 40, and the sheets have been transferred to storage car 98, storage car 98 may be wheeled out in a similar fashion as to applicator car 76 to allow for ease of unloading the stack of coated sheets.

Also in a preferred embodiment, a control panel 13 is provided to control the various features and functions of the machine 10. In addition, various operational modes may be provided from fully automatic to single operation mode which applies the film to only one sheet and transports it to storage car 98 without applying film to a second sheet. This latter mode allows for inspection of the aluminum sheeting between applications.

As disclosed, the present invention provides an automatic skin taping machine for applying a protective coating to a sheet of material without requiring any handling of the sheet. Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit and scope of the invention. Accordingly, the present invention is intended to encompass such rearrangements, modifications, and substitutions of parts and elements as fall within the spirit and scope of the present invention.

We claim:

1. An automatic skin taping machine for use in applying a protective coating of an adhesive coated film or tape to a surface of a sheet of material having a first and a second end, the machine comprising:
   a main frame;
   a transfer car engaged within said main frame and movable substantially along the length of said main frame;
   applicator means for uniformly applying the coating to the sheet of material without a significant number of air bubbles or creases in the applied coating, the applicator means being attached to said transfer car and wherein the applicator means applies the protective coating by moving over the surface of the sheet, and said applicator means having a first raised position, a second lowered applicating position, a front edge, and a trailing edge;
   vacuum lift means attached to said transfer car for lifting the sheet of material to a raised position after the coating is applied by engaging the coated surface of the sheet, said vacuum lift means being movable between a raised position and a lowered position; and
   retaining means for immobilizing the sheet of material while the applicator means applies the coating.

2. The machine of claim 1 wherein said applicator means comprises a floating roller.

3. The machine of claim 1 wherein said applicator means comprises a floating roller and a squeegee positioned at the trailing edge of the roller.

4. The machine of claim 1 further comprising a cutter engaged with said applicator means and positioned beyond the trailing edge of the applicator means for cutting the coating, the cutter being moveable between a raised position and a lowered cutting position.

5. The machine of claim 4 wherein the cutter is a hot wire cutter.

6. The machine of claim 4 further comprising a sheet-end sensor attached to the transfer car that senses the second end of the sheet and causes the cutter to move from the raised position to the lowered cutting position thereby cutting the coating.

7. The machine of claim 1 further comprising a sheet-end sensor attached to the transfer car that senses the second end of the sheet and causes the applicator means to move from the lowered applicating position to the raised position.

8. The machine of claim 1 wherein the vacuum lift means comprises vacuum cups adapted for engaging the coated side of the sheet and a network of piping connected to a vacuum source to provide vacuum to the cups.

9. The machine of claim 1 further comprising a carousel attached to said transfer car and being capable of holding multiple rolls of coating material of differing widths.

10. The machine of claim 1 wherein said retaining means is a removable block having a first upright position in which it engages the second end of the sheet of material and a second lower position in which the block is below the surface of the sheet.

11. The machine of claim 10 further comprising block tripping means connected to said applicator means for tripping the block and causing it to move from its upright position to its second lower position as the applicator means approaches the block to allow the applicator means to pass without obstruction.

12. An automatic skin taping machine for applying a protective coating of an adhesive coated film or tape to a surface of a sheet of material having a first and a second end, the machine comprising:
- a main frame;
- a transfer car engaged within said main frame and movable along the length of said main frame;
- an applicator table positionable within said main frame and capable of receiving a stack of sheets of material;
- an applicator attached to said transfer car and having a first raised position, a second lowered applicating position, a front edge and a trailing edge;
- a cutter connected to said applicator and positioned behind the trailing edge of the applicator;
- a removable block engaged with said applicator table and positioned to engage the second end of the sheet of material;
- a vacuum lift means attached to said transfer car for lifting the sheet of material to a raised position by engaging the coated side of the sheet, said vacuum lift means having a raised position and a lowered position; and
- a storage table positionable within said main frame and capable of receiving a stack of coated sheets of material.

13. The machine of claim 12 wherein the applicator comprises a floating roller and a squeegee positioned behind the trailing edge of said roller.

14. The machine of claim 12 wherein the cutter is a hot wire cutter.

15. The machine of claim 12 further comprising a carousel attached to said transfer car and comprising two or more shafts for holding rolls of coating material of differing widths.

16. The machine of claim 12 further comprising block tripping means connected to said applicator for causing the block to move from a first position engaging the second end of the sheet of material to a second lowered position below the surface of sheet of material to allow the applicator to pass without obstruction.

* * * * *